(12) United States Patent
Radhakrishnan et al.

(10) Patent No.: US 10,802,903 B2
(45) Date of Patent: Oct. 13, 2020

(54) LOGGING ERRORS IN ERROR HANDLING DEVICES IN A SYSTEM

(71) Applicant: INTEL CORPORATION, Santa Clara, CA (US)

(72) Inventors: Sivakumar Radhakrishnan, Portland, OR (US); Malay Trivedi, Chandler, AZ (US); Jayasekhar Tholiyil, Hillsboro, OR (US); Erik A. McShane, Phoenix, AZ (US); Roger W. Liu, Denver, CO (US); Mahesh S. Natu, Folsom, CA (US)

(73) Assignee: INTEL CORPORATION, Santa Clara, CA (US)

( * ) Notice: Subject to any disclaimer, the term of this patent is extended or adjusted under 35 U.S.C. 154(b) by 215 days.

(21) Appl. No.: 15/846,170

(22) Filed: Dec. 18, 2017

(65) Prior Publication Data

US 2019/0034264 A1 Jan. 31, 2019

(51) Int. Cl.
*G06F 11/07* (2006.01)

(52) U.S. Cl.
CPC ...... *G06F 11/0787* (2013.01); *G06F 11/0736* (2013.01); *G06F 11/0751* (2013.01); *G06F 11/0772* (2013.01); *G06F 11/0766* (2013.01); *G06F 11/0781* (2013.01); *G06F 11/0784* (2013.01)

(58) Field of Classification Search
CPC ............. G06F 11/0787; G06F 11/0736; G06F 11/0751; G06F 11/0772; G06F 11/0766; G06F 11/0784; G06F 11/0781
See application file for complete search history.

(56) References Cited

U.S. PATENT DOCUMENTS

| 4,554,661 | A  | * | 11/1985 | Bannister | G06F 11/0781 714/45 |
| 7,346,813 | B1 | * | 3/2008 | Schulz | G06F 11/2268 714/26 |
| 10,360,092 | B1 | * | 7/2019 | Ayoub | G06F 11/0784 |

(Continued)

OTHER PUBLICATIONS

Lim, A.B., et al., "Platform-Level Error Handling Strategies for Intel Systems", White Paper, © 2011 Intel Corporation, May 2011, 26 pp.

(Continued)

*Primary Examiner* — Joseph O Schell
(74) *Attorney, Agent, or Firm* — Konrad Raynes Davda & Victor LLP; David W. Victor

(57) ABSTRACT

An error handling device logs errors in a computing system including a plurality of devices connected to the error handling device. The error handling device provides groups of error registers. Each group of error registers is associated with a value of a plurality of values. Each of the devices that communicate errors to the error handling device are associated with one of the values. The error handling device receives error messages from the devices connected to the error handling device and for each received error message of the received error messages, determines a value of the plurality of values associated with the device transmitting the received error message, determines the group of error registers associated with the determined value, and log the received error message in the determined group of error registers.

25 Claims, 7 Drawing Sheets

(56) References Cited

U.S. PATENT DOCUMENTS

| | | | |
|---|---|---|---|
| 2004/0078732 A1* | 4/2004 | Meaney | G06F 11/0772 714/57 |
| 2010/0162269 A1* | 6/2010 | Lucas | G06F 11/0793 719/318 |
| 2013/0159764 A1* | 6/2013 | Adar | G06F 11/0745 714/5.1 |
| 2014/0245079 A1* | 8/2014 | Larson | G06F 11/0724 714/48 |
| 2014/0281724 A1* | 9/2014 | Ki | G06F 11/26 714/37 |
| 2015/0058669 A1* | 2/2015 | Salle | G06F 11/2236 714/30 |
| 2019/0050279 A1* | 2/2019 | Derr | G06F 11/079 |

OTHER PUBLICATIONS

Singh, U.P., "PCIe Error Logging and Handling on a Typical SoC", [online], [Retrieved on Nov. 19, 2017], Retrieved from the Internet at <URL: https://www.design-reuse.com/articles/?id=38374&print=yes>, 8 pp.

* cited by examiner

Error Message

Group of Global/Local Error Registers

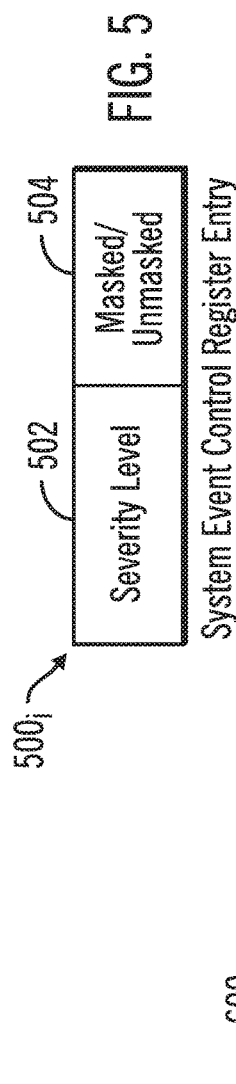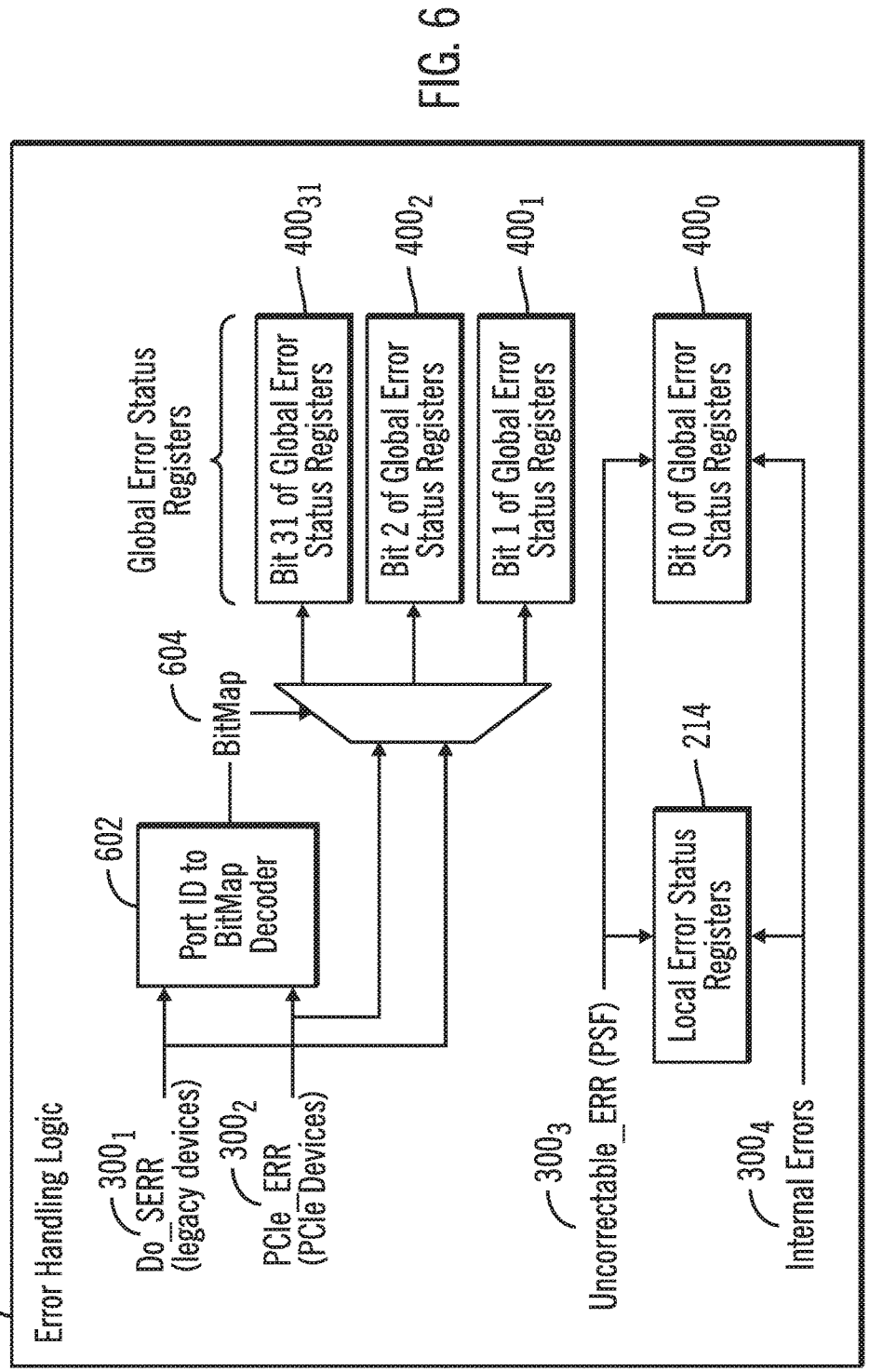

LOGGING ERRORS IN ERROR HANDLING DEVICES IN A SYSTEM

TECHNICAL FIELD

Embodiments described herein generally relate to logging errors in error handling devices in a system.

BACKGROUND

Systems, such as a system-on-a-chip (SOC), provide for logging and handling errors from connected device. Errors may occur at the devices connected to the SOC and in transmission of packets at different layers of communication within the SOC, such as transaction layer errors, data link layer errors, physical layer errors. Errors may be classified as correctable errors handled by hardware and uncorrectable errors, such as fatal and non-fatal errors, to be handled by device specific software and system software. Reliability, availability, and serviceability (RAS) requirements in the system design include error harvesting, which is logging and reporting errors. Error reporting is needed to perform platform diagnostics to identify the cause of server system hangs in the field (both on-site and remote), crash data collection and FRU (Field Replaceable Unit) isolation in the event a catastrophic error becomes mandatory. Since unintended global power cycles and unexpected warm reset events can hinder the ability to read error data following catastrophic errors that can freeze the system or from cyber-attacks, new error harvesting schemes are essential before and after reset for system administrators to rapidly debug and reduce downtime by isolating and localizing the cause of failure to the platform, SOC or within the various functional blocks (IPs) inside the chipset.

A server error reporting scheme for the Intel Xeon® server consists of a global integrated error handler (GIEH) coupled with a number of satellite integrated error handlers (SIEH) that are distributed through Platform Controller Hubs (PCHs) in a system-on-a-chip, such as the North and South complexes of the SOC package. For a u-server error architecture, such as used with the Intel Atom™ based monolithic dies, the SOC has a single GIEH connected to various error sources that generate errors. In the case of client systems, the SOC relies on the Interrupt Timer Subsystem (ITSS) IP for error logging scheme and reporting, which provides one error logging bit for the PCHs.

BRIEF DESCRIPTION OF THE DRAWINGS

Embodiments are described by way of example, with reference to the accompanying drawings, which are not drawn to scale, in which like reference numerals refer to similar elements.

FIG. 5 illustrates an embodiment of a system event control register entry.

FIG. 6 illustrates an embodiment of error handling logic.

DESCRIPTION OF EMBODIMENTS

Figure 1:
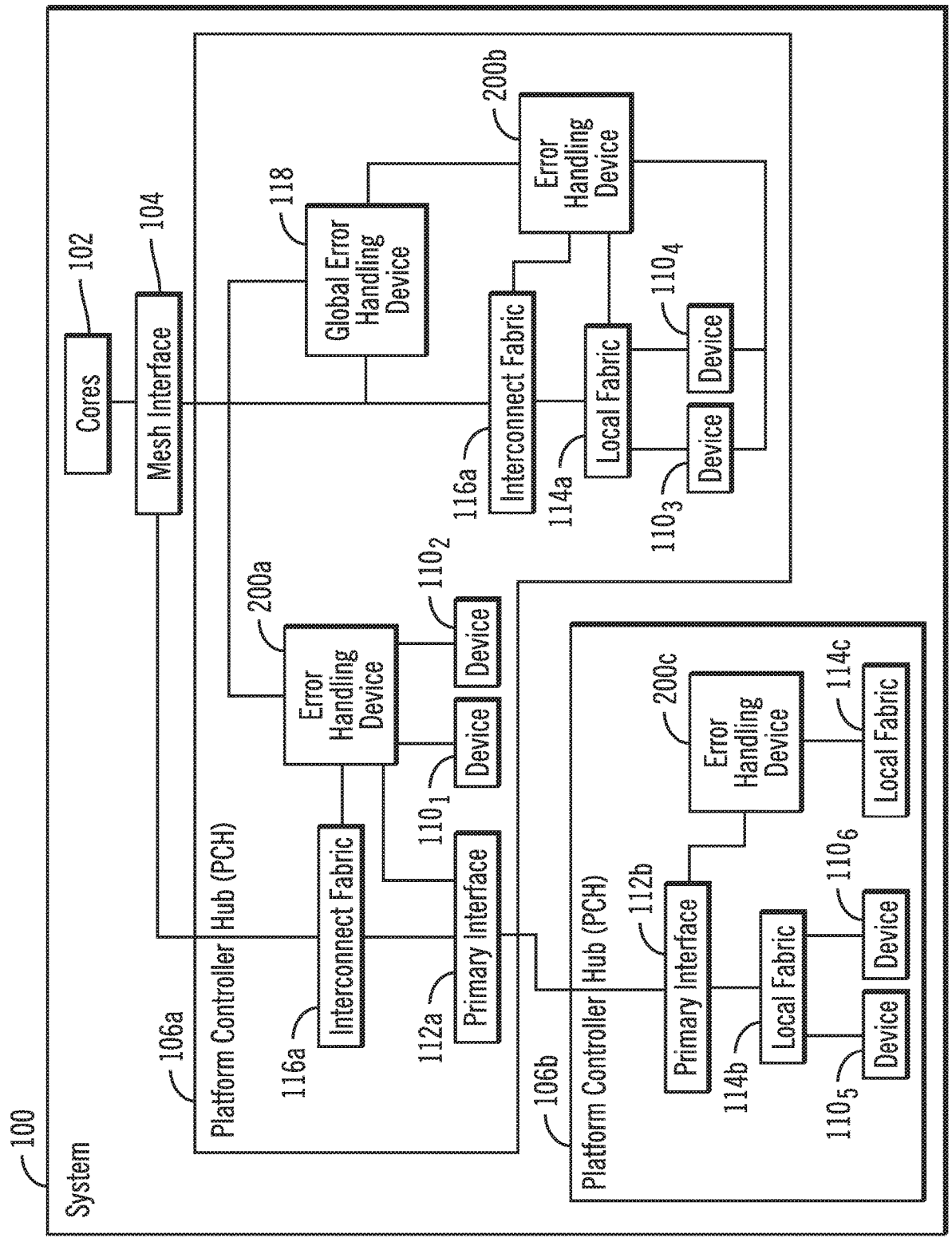
FIG. 1 illustrates a system in which embodiments are implemented.

Described embodiments provide error handling in platform controller hubs (PCHs) deploying multiple error handling devices to harvest and propagate errors to a global error handling device to accommodate various types of systems in which error handling embodiments will be deployed, from servers to clients. Described embodiments provide extensive error logging and reporting capability for use by software to rapidly debug and isolate the faulty unit in a timely fashion compared to other earlier implementations.

Described embodiments provide improvements to error reporting by providing in each of the error handling devices error registers, such as global and local error registers. Values, such as bit values provide indexes to groups of registers in the error registers. Each of the devices connected to the error handling device are associated with one of the values to associate the device communicating an error message with a group of error registers in the error registers. Errors for a device are then logged in the group of error registers to which that device maps. In certain embodiments, the port identifier of the device may be used to determine the group of error registers in which to log the error message. Further, with described embodiments, error messages from devices, such as Peripheral Component Interconnect Express (PCIe) and legacy devices, local fabrics, and internal errors logged in a global error register, are reported as system events to consider propagating to a global error handling device receiving errors from multiple error handling devices distributed throughout different platform control hubs (PCH), that connect through primary interfaces.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Certain embodiments relate to storage device electronic assemblies. Embodiments include both devices and methods for forming electronic assemblies.

FIG. 1 illustrates an embodiment of a system 100, such as a system-on-a-chip (SOC) or comprised of multiple integrated circuit dies, including a plurality of processing cores 102 that connect via mesh or other interface 104 to different platform controller hubs (PCH) 106a, 106b. In one embodiment, the PCH 106a may comprise a Northbridge hub and the PCH 106b may comprise the Southbridge hub. PCH 106a includes error handling device 200a to logs errors from connected devices $110_1$, $110_2$ and error handling device 200b to log errors from devices $110_3$, $110_4$ and a local fabric 114a, such as a primary scalable fabric (PSF) based on the integrated On-Chip System Fabric (IOSE) specification. The IOSF specification and PSF specifications are developed by Intel® Corporation. (Intel is a registered trademark throughout the world) The PCH 106b includes error handling device 200c to log errors from devices $110_5$, $110_6$ and the local fabrics 112b, 112c, e.g., PSFs. The PCHs 106a, 106b connect via primary interfaces 112a, 112b, such as a Direct Media Interface (DMI), RUNK, etc. The PCH 106a further includes interconnect fabric 116a, 116b to provide interconnection of the error handling devices 200a, 200b. The error handling devices 200a, 200b and 200c may propagate errors to a global error handling device 118 in the PCH 106a.

The devices $110_1$, $110_2$ ... $110_6$ may be located external to the system 100, such as devices external to the SOC. The devices $110_1$, $110_2$ ... $110_6$ may comprise legacy devices and PCIe devices, such as memory, storage, graphics cards, etc.

In alternative embodiments, there may be only one or more than two PCHs in the system 100, fewer or different types or number of interconnects than shown, and fewer or more devices, fabrics, and interconnects than shown. The interconnects and fabrics may be implemented using IOSF, PSF and mesh interface, and/or different types of interface protocols.

Figure 2:
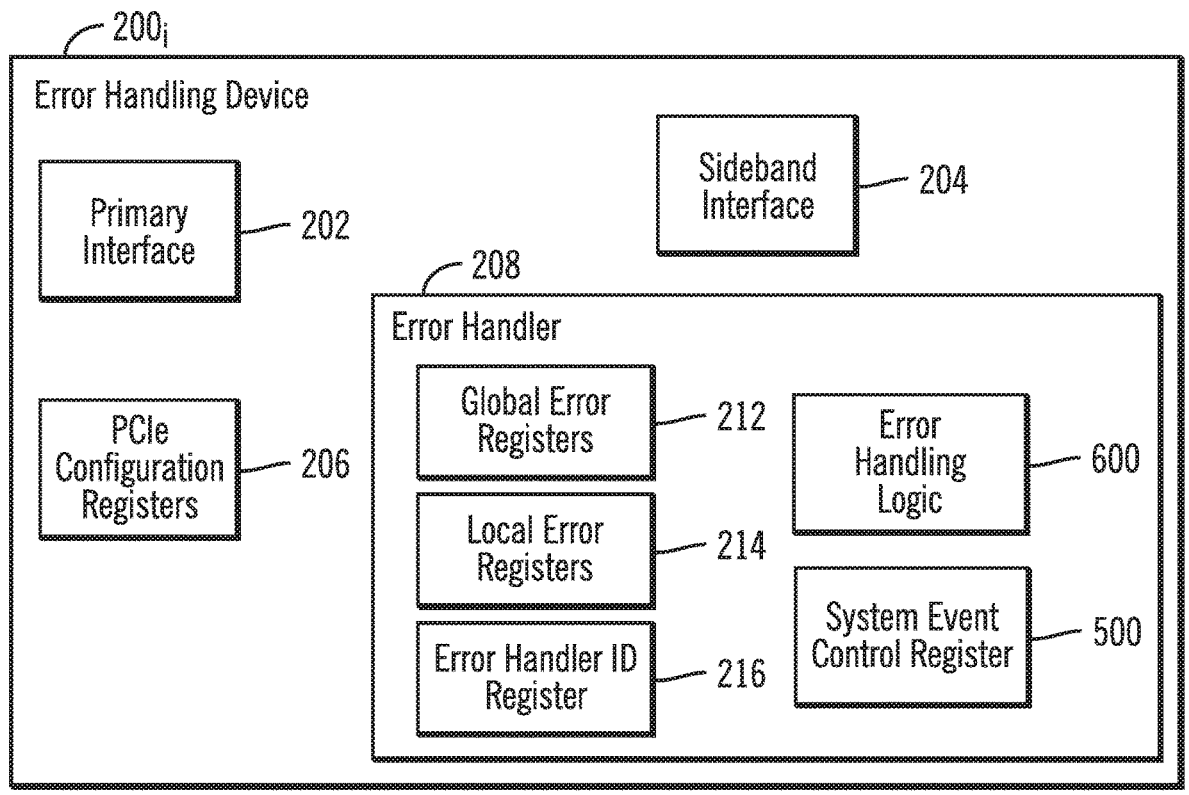
FIG. 2 illustrates an embodiment of an error handling device.

FIG. 2 illustrates an instance $200_i$ of one of the error handling devices, such as error handling devices 200a, 200b, 200c, and includes a primary interface 202 to connect to a primary interface 112a, 112b, such as an IOSTF primary interface, a sideband interface 204 to receive and send error messages on an IOSF type interface, PCIe configuration registers 206 for communicating with PCIe devices, and an error handler 208. The error handler 208 includes the logic 600 to perform error handling operations, global error registers 212 in which error messages are logged to forward to the global error handling device 118, and local error registers 214 in which certain errors are also logged, including internal errors in the error handling device $200_i$, such as internal errors in the primary interface 202, PCIe configuration registers 206, and sideband interface 204, and connected local fabrics, such as local fabric errors 112a 112b. An error handler identifier (ID) register 216 provides a unique identifier of the error handling device $200_i$ among the error handling devices. A system event control register 500 indicating when to mask or unmask error messages logged in the global error registers 212 to forward to the global error handling device 118.

Figure 3:
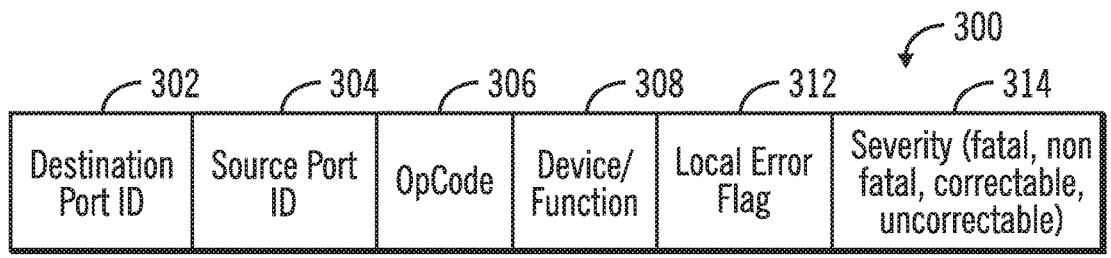
FIG. 3 illustrates an embodiment of an error message.

FIG. 3 illustrates an embodiment of a received error message 300 from one of the devices $110_1$ (e.g., PCIe and legacy devices), a local fabric $114_i$ (e.g., PSF), or internal errors. The internal errors from components 202, 204, 206 within the error handling device $200_i$ may have a different format than shown. An error message 300 may include one or more of the following fields, including: a destination port identifier (ID) 302 indicating a port to which the error message 300 is directed; a source port ID 304 of the source port from which the error message is originated; an operation code (opcode) 306 of the error message; a device/function 308, such that for PCIe devices a device and function of the device may be indicated, and for other types of device no function may be indicated; a local error flag 312 indicating whether the error message should be logged in the local error registers 214; and a severity level 314 of the error, such as fatal, non-fatal, correctable, uncorrectable, etc.

In certain embodiments, a device $110_i$ connected to the error handling device $200_i$ may generate error messages 300 such as PCIe error messages (PCI_ERR), e.g., data parity errors, Do_SERR messages, e.g., unrecoverable fatal or non-fatal errors, errors, and uncorrectable, and uncorrectable Advanced Error Reporting (AER) error messages over the IOSF sideband interface 204.

Figure 4:
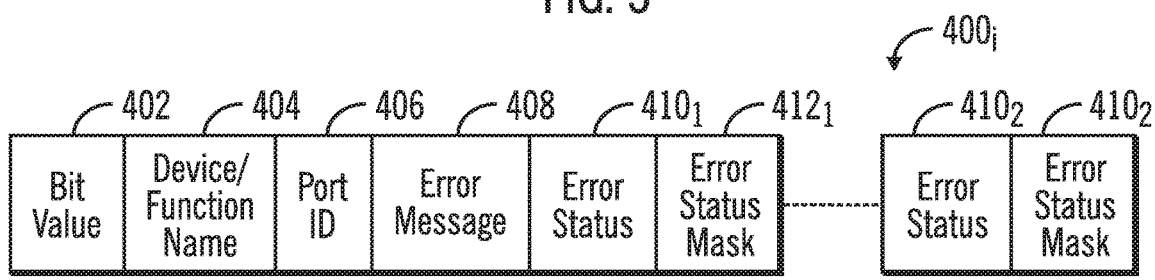
FIG. 4 illustrates an embodiment of a group of global/local error registers.

FIG. 4 illustrates an embodiment of a group/local error registers $400_i$ for a mapped device, PSF or internal error. A group of registers $400_i$ may include one or more of the following fields, including: a bit value 402 providing an index into a group of registers in the global 212 or local 214 error registers to which a device port ID or other information maps; a device/function name 404 of the device that originated the error, where a function name is indicated if the PCIe device that generated the error comprises a PCIe function; a port ID 406 of the device transmitting the error used to determine the bit value 402; an error message 408; and one or more pairs of an error status register $410_1$ ... $410_2$ and corresponding error status mask register $412_1$ ... $412_2$ for each of the different possible severity levels that can be indicated in the error messages, such as correctable, uncorrectable fatal, and uncorrectable non-fatal. The error status mask register $412_1$ ... $412_2$ indicates whether an error having the corresponding error status in an error status register $410_1$ ... $410_2$ is to be masked, i.e., not logged, or unmasked, i.e., logged. For a reported error, one of the error status registers $410_i$ is set, e.g., 1, for the error severity of the received message 300, and the other error status registers for error severity levels other than indicated in the reported error are not set, e.g., 0.

A group of error registers $400_i$ may comprise a column of registers in a bitmap table where the bit value 402 used as the index into the registers 212, 214 comprises the column number in the registers, where the bit/index values are indicated in registers across a row of registers. Other groups of registers in the global and local error registers may be used to form the groups $400_i$ of error registers for errors from different sources/devices.

FIG. 5 illustrates an embodiment of an entry $500_i$ in the system event control register 500 for a severity level and includes the severity level 502 and a masked/unmasked flag 504 indicating whether the error messages reported as system events of the severity level 502 are masked and not forwarded to the global error handling device 118 or unmasked and forwarded.

FIG. 6 illustrates an embodiment of the error handling logic 600 that includes a bitmap decoder 602 to map the port identifier of connected legacy and PCIe devices sending the error messages, e.g., Do_SERR and PCIe_ERR, to produce a bit value 604 that provides the index to the group of global error status registers $400_1$, $400_2$ ... $400_{31}$ to which the error message $300_1$, $300_2$ maps. The error handling logic 600 further maps uncorrectable errors from the local fabrics $300_3$ and internal errors $300_4$ from the error handling device $200_i$ to local error registers 214 and the group of global error status registers $400_0$ indexed by bit value 0. In one embodiment, the PSF errors and internal errors have a fixed mapping to the first group $400_0$ of registers in the global error registers 212. In alternative embodiments, the errors from the local fabrics 114a, 114b, 114c, e.g., PSF, and internal errors may map to multiple and different groups of global error status registers $400_i$.

In certain embodiments, a Basic Input/Output System (BIOS), such as BIOS 1016 described with respect to FIG.

10, may configure the association of devices, local fabrics, and internal errors to the global 212 and local 214 error registers based on the configuration of devices in the system 100 during system 100 initialization. A software program may set the error status mask registers register $412_1 \ldots 412_2$ in the groups of error registers and set the masks 504 in the system event control register 500. Software may also gather the error information in the error registers 214 for error diagnosis.

Figure 7:
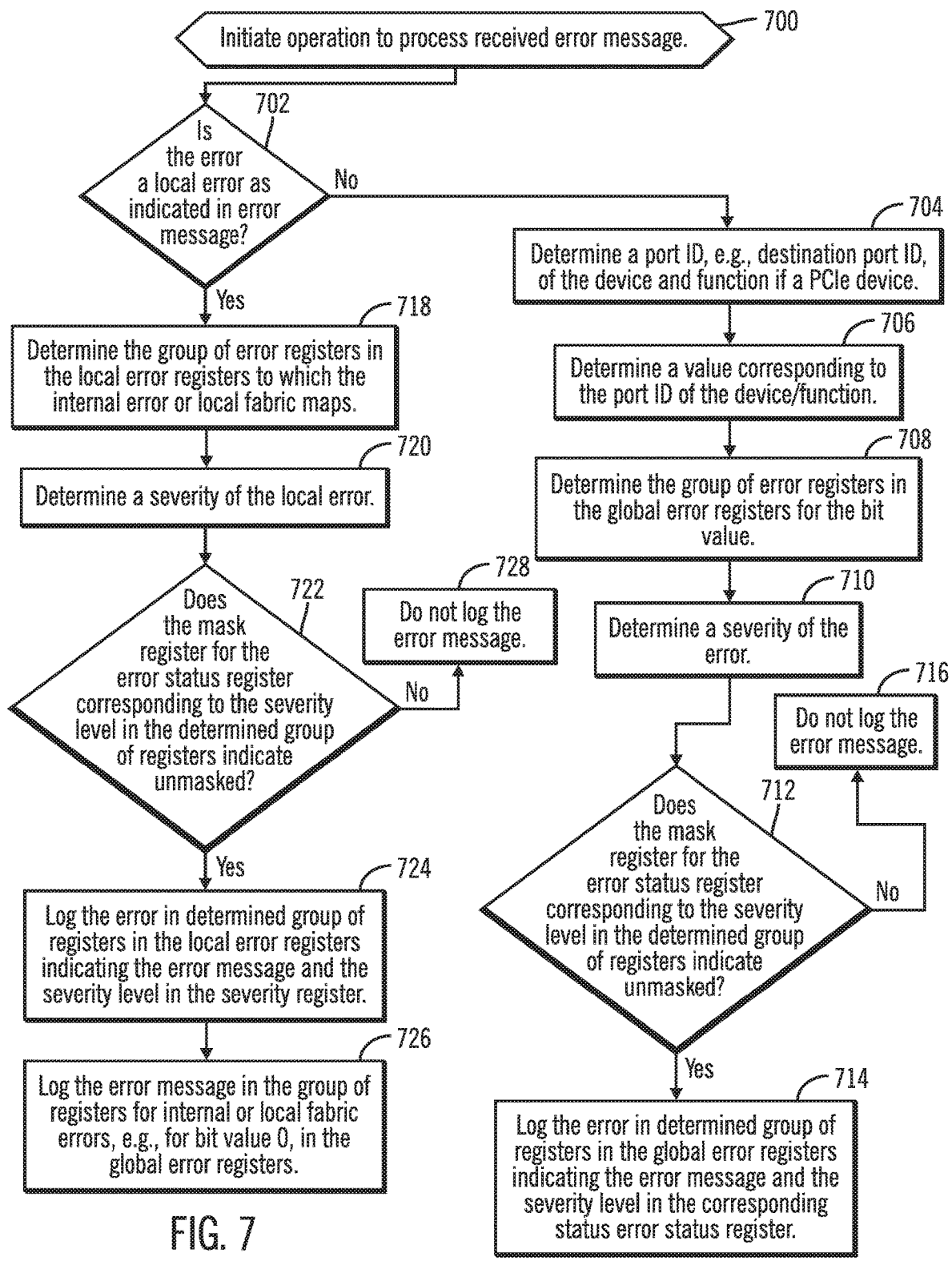
FIG. 7 illustrates an embodiment of error handling logic to process a received error message.

FIG. 7 illustrates an embodiment of operations performed by the error handling logic 600 to process (at block 700) a received error message 300 on the sideband interface 204 or an internal error from one of the components 202, 204, and 206. If (at block 702) the error is not a local error, as indicated in the local error flag 312, then a determination is made (at block 704) of the port ID, such as the destination port ID 302 as indicated in the message 300. A bit value corresponding to the port ID of the device/function is determined (at block 706). The group of error registers $400_i$ in the global error registers 212 is determined (at block 708) for the bit value. The error handling logic 600 determines (at block 710) the severity level 314 of the error. If (at block 712) the mask register $412_j$ for the error status register $410_j$ corresponding to the severity level 314 in the determined group of registers $400_i$ indicates unmasked, then the error handling logic 600 logs (at block 714) the error message in the determined group of registers $400_i$ in the global error registers 412 indicating the error message and the severity level 314 in the corresponding error status register 400 for the severity level 314. If (at block 712) the mask register $412_j$ is masked, then the error message 300 is not logged (at block 716).

If (at block 702) the error is a local error, as indicated in the local error flag 312, then the error handling logic 600 determines (at block 718) the group of error registers $400_i$ in the local error registers 214 to which the received internal error or local fabric error maps, which mapping may be determined by the type of internal error or identity of the local fabric, e.g., PSF device. A severity level 314 of the error message 300 is determined (at block 720). The error handling logic 600 determines (at block 714) the severity level 314. If (at block 722) the mask register $412_j$ for the error status register $410_j$ corresponding to the severity level 314 in the determined group of registers $400_i$ indicates unmasked, then the error handling logic 600 logs (at block 724) the error message in the determined group of registers $400_i$ in the local error registers 214 indicating the error message and the severity level 314 in the corresponding error status register $410_j$ for the severity level 314. Further, the error message 300, for an internal error or local fabric error, is logged (at block 726) in the group of registers $400_i$ in the global error registers 212 for internal or local fabric errors, such as the group of registers $400_0$ for the first bit value of zero in the global error registers 212. If (at block 722) the mask register $412_j$ is masked, then the error message 300 is not logged (at block 728).

With the embodiment of FIG. 7, error messages from devices, such as PCIe and legacy devices, are logged in global error registers 212 using the port ID of the devices to determine a bit value to use as an index into a group of registers in the global error registers 212. Error messages from other components, such as internal errors and local fabrics, may also be logged in local error registers 214 as well as the global error registers 212, where the types of error messages recognized as local errors, e.g., internal errors and local fabric errors, may map to only one group of registers in the global error registers 212, such as the group of registers for the first bit value. Described embodiments thus provide a fast technique for determining the group of error registers in which to log the errors as well as error severity information by providing a mapping using a port identifier or the type of error, such as internal errors and local fabric errors.

Figure 8:
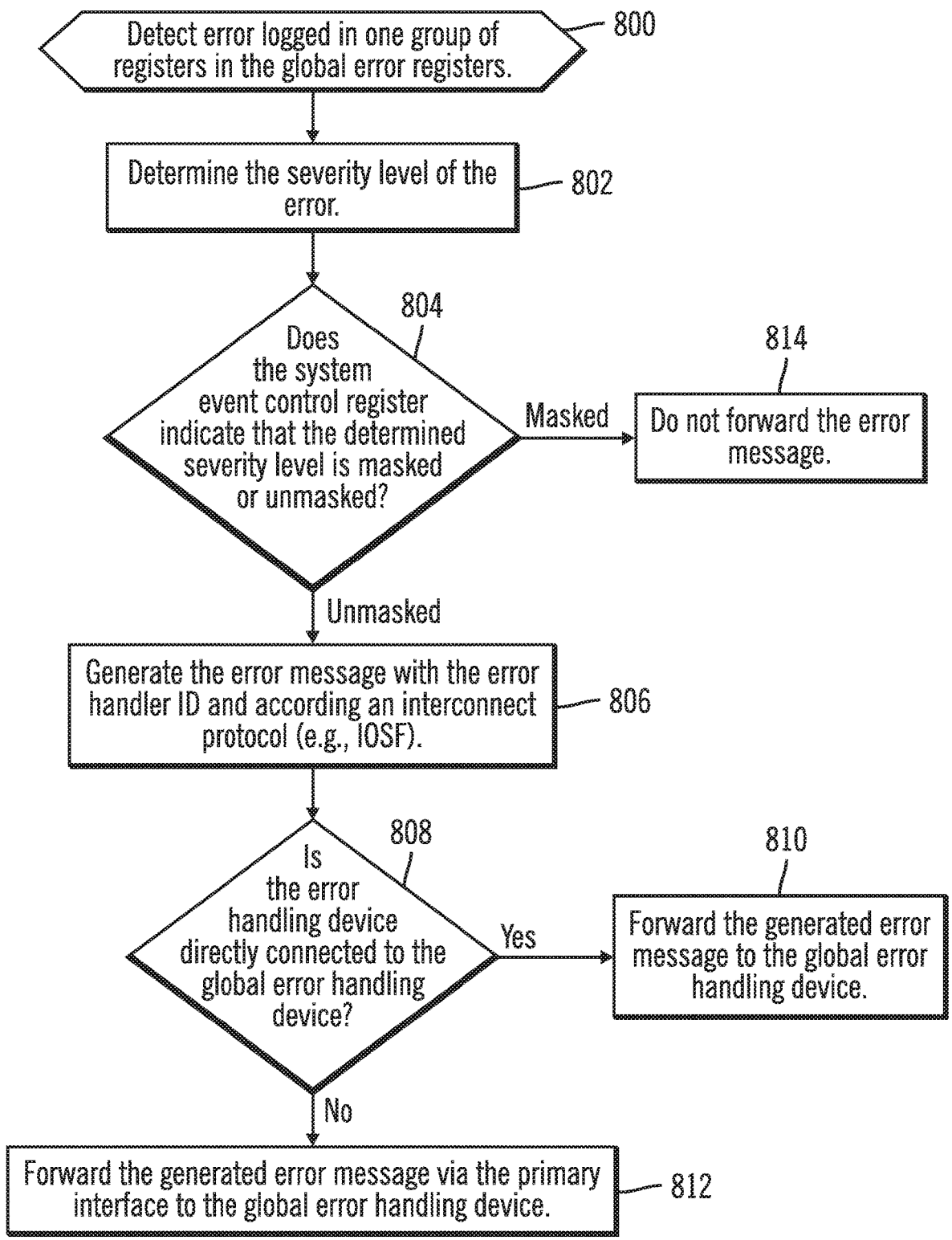
FIG. 8 illustrates an embodiment of error handling logic to detect a logged error in global error registers.

FIG. 8 illustrates an embodiment of operations performed by the error handling logic 600 to forward logged error messages to the global error handling device 118. Upon detecting (at block 800) the logging of an error message in one of the group of error registers $400_i$ in the global error registers 212, the error is reported as a system event and the error handling logic 600 determines (at block 802) the severity level from the error status register $410_i$ that is set. If (at block 804) the system event control register $500_i$ for the determined security level 502 indicates unmasked 504, then the error message 300 is generated (at block 806) with the error handler ID 216 and according to an interconnect protocol, e.g., IOSE If (at block 808) the error handling device $200_i$ is directly connected to the global error handling device 118, then the error handling device $200_i$ forwards (at block 810) the generated error message to the global error handling device 118 through a sideband interface 204, such as an IOSF interconnect. If (at block 808) the global error handling device 118 is not directly connected, then the error handling device $200_i$ forwards (at block 812) the generated error message via the primary interface 112b to another error handling device 200a, such as in the other PCH 106a. If (at block 804) the system event control register $500_i$ for the error severity level of the error message is masked, then the error message is not forwarded to the global error handling device 118.

With the embodiment of FIG. 8, a user may control which messages logged in the global error registers 212 get propagated to the global error handling device 118 by setting masks for error severity levels, which determines whether the error message is masked or unmasked. In certain embodiments, the errors collected by the global error registers are mapped to system events. Masking a system event status forces the status bit of the error status register $410_i$ having the error 0. When a global error status register $410_i$ bit transitions from 0 to 1, the transition may trigger the system event to forward to the global error handling device 118 based on the system event control register 500.

Figure 9:
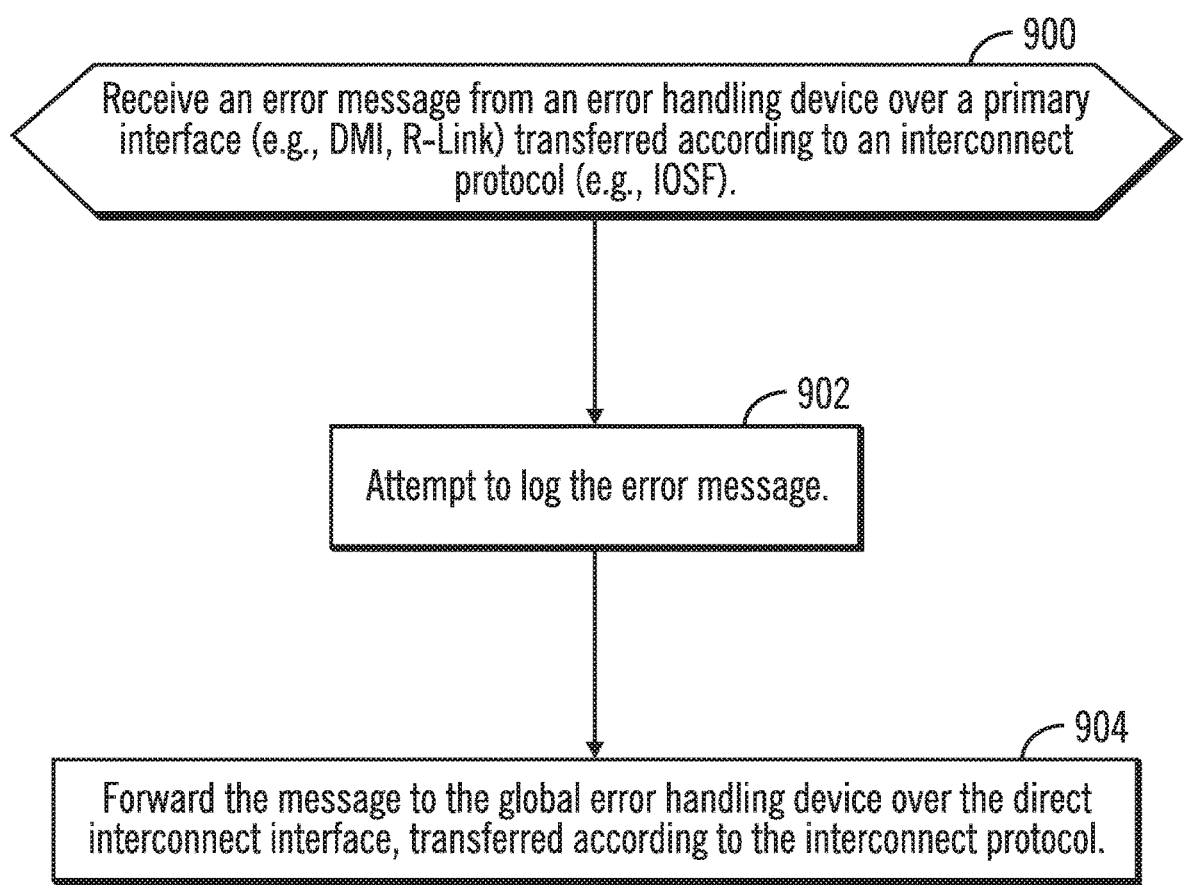
FIG. 9 illustrates an embodiment of error handling logic to process an error message from another error handling device.

FIG. 9 illustrates an embodiment of operations performed by the error handling logic 600 in error handling device $200_i$ to process error messages forwarded by another error handling device $200_j$, such as over a primary interface 112a, 112b or directly. Upon receiving (at block 900) an error message from another error handling device $200_j$, such as over a primary interface 112a, 112b, the error handling logic 600 attempts to log the error message 902, which may not succeed because the error handling device $200_i$ may not include error registers for the devices to which the transmitting error handling device $200_j$ is connected. The error handling logic 600 forwards (at block 904) the error message to the global error handling device 118 over a direct interface connection, e.g., the sideband 204, or through a primary interface 202 to another error handling device $200_k$ to further forward to the global error handling device 118.

With the embodiments of FIG. 9, an error handling device $200_i$ may receive an error message received from another error handling device $200_j$, that is transmitted according to an interconnect protocol, e.g., IOSF, to forward to the global error handling device 118, when the transmitting error handling device 200_j did not have a direct connection to the global error handling device through the interconnect technology, such as IOSF.

Figure 10:
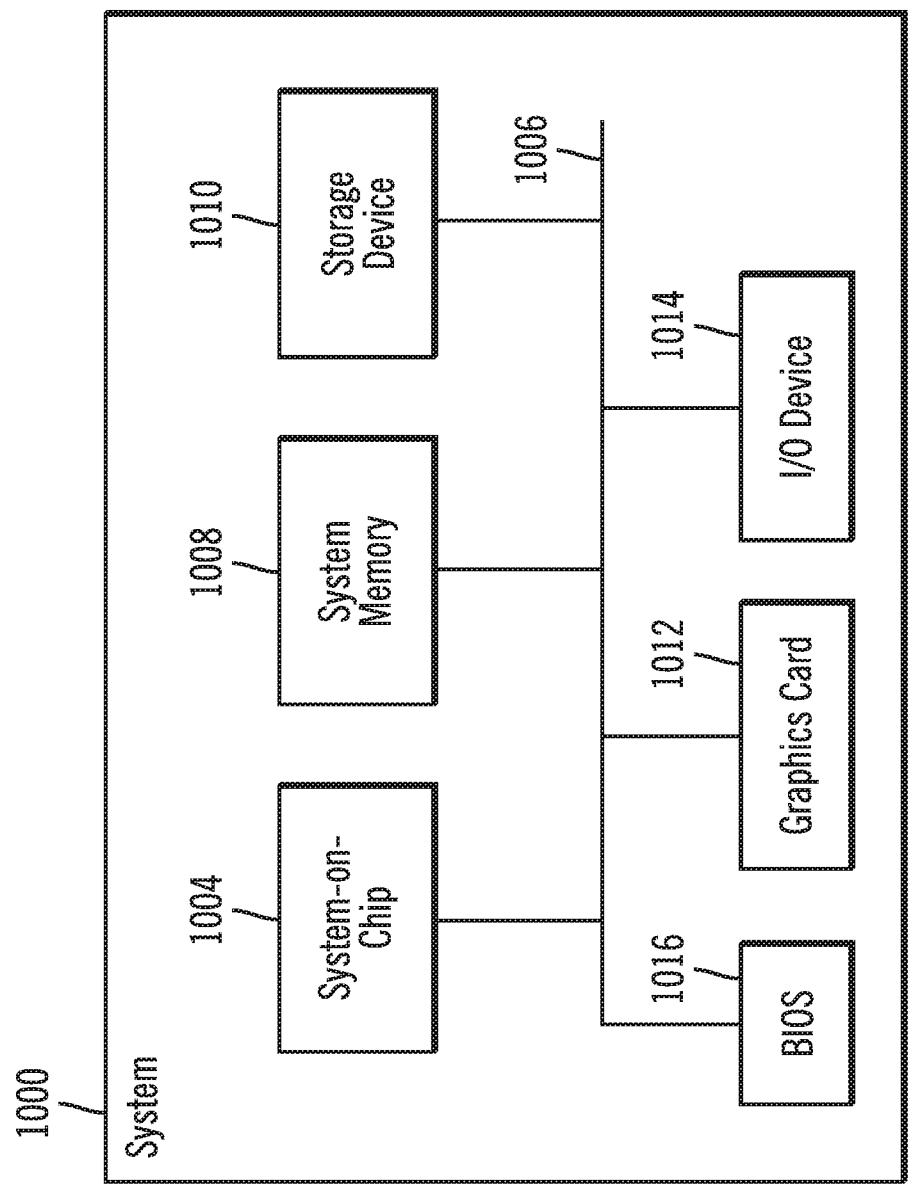
FIG. 10 illustrates a system in which the system of FIG. 1 may be deployed.

FIG. 10 illustrates an embodiment of a system 1000 in which the system 100, e.g., system-on-a-chip (SOC), of FIG. 1 may be deployed as the system-on-chip 1004, a system memory 1008 and a storage device 1010 for long-term storage. The processor 1004 may communicate over a bus 1006 with the system memory 1008, in which programs, operands and parameters being executed are cached, the non-volatile storage device 1010, a graphics card 1012, and other Input/Output (I/O) devices, e.g., display devices, ports, network interfaces, etc. A Basic input Output System (BIOS) 1016 may initialize values for components in the system during system 1000 startup, including the error registers 212, 214, system event control register 500, error handler ID registers 216 of the error handling devices 200a, 200b, 200c and other components. The devices 110_i to which the PCHs 106a, 106b of the system 100 connect may comprise the components 1008, 1010, 1012, and 1014 of the system 1000.

It should be appreciated that reference throughout this specification to "one structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of embodiments of the invention, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description.

EXAMPLES

Example 1 is an error handling device to log errors in a computing system including a plurality of devices connected to the error handling device. The error handling device is configured to: provide groups of error registers, wherein each group of error registers is associated with a value of a plurality of values, and wherein each of the devices that communicate errors to the error handling device are associated with one of the values; receive error messages from the devices connected to the error handling device. For each received error message of the received error messages, the error handling device determines a value of the plurality of values associated with the device transmitting the received error message; determines the group of error registers associated with the determined value; and logs the received error message in the determined group of error registers.

In Example 2, the subject matter of examples 1 and 3-13 can optionally include that port identifiers of the devices map to the values, wherein to determine the value of a device transmitting the received error message is to determine the value mapping to the port identifier of the device transmitting the received error message.

In Example 3, the subject matter of examples 1, 2 and 4-13 can optionally include that the error handling device is in communication with a global error handling device, and furtherer comprises: a system event control register indicating for each severity level of a plurality of severity levels whether the received error messages having the severity level are masked or unmasked. The error handling device is further to indicate in the group of error registers a severity of an error indicated in the received error message; and forward the received error message to the global error handling device in response to the system event control register indicating that the severity level indicated in the group of error registers for the received error message is unmasked.

In Example 4, the subject matter of examples 1-3 and 5-13 can optionally include that at least one device of the devices connected to the error handling device implements multiple device functions, wherein there is one group of registers in the groups of error registers for each device function of the device functions for each of the devices implementing multiple device functions, wherein the group of registers for the at least one device implementing multiple device functions indicates the device and function of the device.

In Example 5, the subject matter of examples 1-4 and 6-13 can optionally include that each group of error registers includes error severity status registers for error severity levels and a mask register for each of the error severity status registers, wherein to log the received error message in the determined group of registers comprises: determine whether the mask register for a severity level indicated in the received error message indicates that the severity level is masked or unmasked, wherein the received error message is logged in response to the mask register for the severity level indicating unmasked, and wherein to log the received error message further comprises to indicate the severity level in the received error message in the error severity status register for the severity level in the received error message, wherein the received error message is not logged in the group of error registers in response to the mask register for the severity level of the received error message indicating masked.

In Example 6, the subject matter of examples 1-5 and 7-13 can optionally include that the error severity levels for which there are error severity status registers include correctable, fatal uncorrectable, and non-fatal uncorrectable errors.

In Example 7, the subject matter of examples 1-6 and 8-13 can optionally include that the error handling device is in communication with a global error handling device, wherein the groups of error registers include global error registers and local error registers, wherein the error handling device is further to: determine whether the received error message indicates a local error message, wherein the determined group of error registers are in the local error registers in response to the received error message indicating the local error message, and wherein the determined group of error registers are in the global error registers in response to the received error message not indicating a local error message; and forward error messages logged in the global error registers to the global error handling device.

In Example 8, the subject matter of examples 1-7 and 9-13 can optionally include that the local error registers provide groups of registers preassigned to internal errors from the error handling device and at least one local fabric coupled to the error handling device, wherein the error handling device is further to: log the received error message logged in the group of registers in the local error registers in a group of registers in the global error registers; and forward the received error message logged in the groups of registers in the local error registers and the global error registers to the global error handling device.

In Example 9, the subject matter of examples 1-8 and 10-13 can optionally include that received error messages for the internal errors and the errors from the at least one local fabric are logged in one group of registers in the global error registers.

In Example 10, the subject matter of examples 1-9 and 11-13 can optionally include that the global error registers log errors from legacy and Peripheral Component Interconnect Exchange (PCIe) devices coupled to the error handling device, wherein the local error registers log internal errors from the error handling device and errors from at least one local fabric coupled to the error handling device, and wherein one group of error registers in the global error registers associated with one value of the values logs the internal errors and the errors from the at least one local fabric.

In Example 11, the subject matter of examples 1-10 and 12-13 can optionally include that the computer system includes a plurality of additional error handling devices in the computer system that log errors for different devices in the computer system than handled by the error handling device and a global error handling device to log received error messages from the error handling device and the additional error handling devices, wherein the additional error handling devices and the error handling device are programmed with a unique identifier to distinguish the error handling devices, wherein the error handling device is further to: forward received error messages logged in the groups of error registers to the global error handling device including the unique identifier of the error handling device.

In Example 12, the subject matter of examples 1-11 and 13 can optionally include that the error handling device is further to: forward received error messages logged in the groups of error registers to a global error handling device over a primary interface to an additional error handling device when the error handling device does not provide a direct interface to the global error handling device, wherein the additional error handling device that receives the received error message forwards the received error message to the global error handling device; and forward received error messages logged in the groups of error registers to the global error handling device when the error handling devices provides a direct interface to the global error handling device.

In Example 13, the subject matter of examples 1-12 can optionally include that the error handling device is further to: receive an error message on a primary interface directed to the global error handling device; log the received error message directed to the global error handling device in the error registers; and forward the error message to the global error handling device over a direct interface.

Example 14 is a system, including: a processor; a plurality of devices in communication with the processor; an error handling device to log errors in the system, wherein the error handling device is configured to: provide groups of error registers, wherein each group of error registers is associated with a value of a plurality of values, and wherein each of the devices that communicate errors to the error handling device are associated with one of the values; receive error messages from the devices connected to the error handling device; and for each received error message of the received error messages: determine a value of the plurality of values associated with the device transmitting the received error message; determine the group of error registers associated with the determined value; and log the received error message in the determined group of error registers.

In Example 15, the subject matter of examples 14 and 16-19 can optionally include that port identifiers of the devices map to the values, wherein to determine the value of a device transmitting the received error message is to: determine the value mapping to the port identifier of the device transmitting the received error message.

In Example 16, the subject matter of examples 14, 15 and 17-19 can optionally include a global error handling device; a system event control register indicating for each severity level of a plurality of severity levels whether the received error messages having the severity level are masked or unmasked; wherein the error handling device is further to: indicate in the group of error registers a severity of an error indicated in the received error message; and forward the received error message to the global error handling device in response to the system event control register indicating that the severity level indicated in the group of error registers for the received error message is unmasked.

In Example 17, the subject matter of examples 14-16 and 18-19 can optionally include that each group of error registers includes error severity status registers for error severity levels and a mask register for each of the error severity status registers, wherein to log the received error message in the determined group of registers comprises: determine whether the mask register for a severity level indicated in the received error message indicates that the severity level is masked or unmasked; wherein the received error message is logged in response to the mask register for the severity level indicating unmasked, and wherein to log the received error message further comprises to indicate the severity level in the received error message in the error severity status register for the severity level in the received error message, wherein the received error message is not logged in the group of error registers in response to the mask register for the severity level of the received error message indicating masked.

In Example 18, the subject matter of examples 14-17 and 19 can optionally include that a global error handling device, wherein the groups of error registers include global error registers and local error registers, wherein the error handling device is further to: determine whether the received error message indicates a local error message, wherein the determined group of error registers are in the local error registers in response to the received error message indicating the local error message, and wherein the determined group of error registers are in the global error registers in response to the received error message not indicating a local error message; and forward error messages logged in the global error registers to the global error handling device.

In Example 19, the subject matter of examples 14-18 can optionally include a plurality of additional error handling devices; a global error handling device; wherein the error handling device is further to: forward received error messages logged in the error registers to the global error handling device over a primary interface to an additional error handling device when the error handling device does not provide a direct interface to the global error handling device, wherein the additional error handling device that receives the received error message forwards the received error message to the global error handling device; and forward received error messages logged in the groups of error registers to the global error handling device when the error handling devices provides a direct interface to the global error handling device.

Example 20 is a method for an error handling device to log errors in a computing system including a plurality of devices connected to the error handling device, comprising: providing groups of error registers, wherein each group of error registers is associated with a value of a plurality of values, and wherein each of the devices that communicate errors to the error handling device are associated with one of the values; receiving error messages from the devices connected to the error handling device; and for each received error message of the received error messages: determining a value of the plurality of values associated with the device transmitting the received error message; determining the group of error registers associated with the determined value; and ti logging the received error message in the determined group of error registers.

In Example 21, the subject matter of examples 20 and 22-25 can optionally include that port identifiers of the devices map to the values, wherein the determining the value of a device transmitting the received error message comprises: determining the value mapping to the port identifier of the device transmitting the received error message.

In Example 22, the subject matter of examples 20, 21 and 23-25 can optionally include providing a system event control register indicating for each severity level of a plurality of severity levels whether the received error messages having the severity level are masked or unmasked; indicating in the group of error registers a severity of an error indicated in the received error message; and forwarding the received error message to a global error handling device in response to the system event control register indicating that the severity level indicated in the group of error registers for the received error message is unmasked.

In Example 23, the subject matter of examples 20-22 and 24-25 can optionally include that each group of error registers includes error severity status registers for error severity levels and a mask register for each of the error severity status registers, wherein the logging the received error message in the determined group of registers comprises: determining whether the mask register for a severity level indicated in the received error message indicates that the severity level is masked or unmasked, wherein the received error message is logged in response to the mask register for the severity level indicating unmasked, and wherein to log the received error message further comprises to indicate the severity level in the received error message in the error severity status register for the severity level in the received error message, wherein the received error message is not logged in the group of error registers in response to the mask register for the severity level of the received error message indicating masked.

In Example 24, the subject matter of examples 20-23 and 25 can optionally include that the groups of error registers include global error registers and local error registers, further comprising: determining whether the received error message indicates a local error message, wherein the determined group of error registers are in the local error registers in response to the received error message indicating the local error message, and wherein the determined group of error registers are in the global error registers in ti response to the received error message not indicating a local error message; and forwarding error messages logged in the global error registers to a global error handling device.

In Example 25, the subject matter of examples 20-24 can optionally include forwarding received error messages logged in the error registers to a global error handling device over a primary interface to an additional error handling device when the error handling device does not provide a direct interface to the global error handling device, wherein the additional error handling device that receives the received error message forwards the received error message to the global error handling device; and forwarding received error messages logged in the groups of error registers to the global error handling device when the error handling devices provides a direct interface to the global error handling device.

Example 26 is an apparatus for an error handling device to log errors in a computing system including a plurality of devices connected to the error handling device, comprising: means for providing groups of error registers, wherein each group of error registers is associated with a value of a plurality of values, and wherein each of the devices that communicate errors to the error handling device are associated with one of the values; means for receiving error messages from the devices connected to the error handling device; and means for performing for each received error message of the received error messages: determining a value of the plurality of values associated with the device transmitting the received error message; determining the group of error registers associated with the determined value; and logging the received error message in the determined group of error registers.

Example 27 is an apparatus comprising means to perform a method as described in preceding Examples 1-26.

Example 28 is a machine-readable storage including machine-readable instructions, when executed, to implement a method or realize an apparatus as claimed in preceding Examples 1-26.

What is claimed:

1. An error handling device to log errors in a computing system including a plurality of devices connected to the error handling device, wherein the error handling device is configured to:
   provide groups of error registers, wherein each group of error registers is associated with a value of a plurality of values, and wherein each of the devices communicate errors to the error handling device and are associated with one of the values;
   provide a decoder to map the devices to the values;
   receive error messages from the devices connected to the error handling device; and
   for each received error message of the received error messages:
      determine, from the decoder, a value of the plurality of values associated with the device communicating the received error message;
      determine a group of error registers, of the groups of error registers, that is associated with the determined value; and
      log the received error message in the determined group of error registers.

2. The error handling device of claim 1, wherein the decoder maps port identifiers of the devices to the values, wherein to determine the value of the device communicating the received error message comprises:
   determine, from the decoder, the value mapping to a port identifier of the device communicating the received error message.

3. The error handling device of claim 1 in communication with a global error handling device, further comprising:
   a system event control register indicating, for each severity level of a plurality of severity levels, whether a received error message of the received error messages has a severity level of masked or unmasked;
wherein the error handling device is further to:
indicate, in the group of error registers, a severity of an error indicated in the received error message; and
forward the received error message to the global error handling device in response to the system event control register indicating that the severity level indicated in the group of error registers for the received error message is unmasked.

4. The error handling device of claim 1, wherein at least one device of the devices connected to the error handling device implements multiple device functions, wherein there is one group of registers in the groups of error registers for each device function for each of the devices implementing multiple device functions, wherein the group of registers for the at least one device implementing multiple device functions indicates the device and function of the device.

5. The error handling device of claim 1, wherein each group of error registers includes error severity status registers for error severity levels and a mask register for each of the error severity status registers, wherein to log the received error message in the determined group of registers comprises:
determine whether a mask register for an error severity level indicated in the received error message indicates that an error severity level of the error severity levels is masked or unmasked, wherein the received error message is logged in response to the mask register for the error severity level indicating that the error severity level is unmasked, and wherein to log the received error message further comprises indicating the error severity level in the received error message in the error severity status register for the error severity level in the received error message, wherein the received error message is not logged in the group of error registers in response to the mask register for the error severity level of the received error message indicating masked.

6. The error handling device of claim 5, wherein the error severity levels for which there are error severity status registers include correctable, fatal uncorrectable, and non-fatal uncorrectable errors.

7. The error handling device of claim 1, wherein the error handling device is in communication with a global error handling device, wherein the groups of error registers include global error registers and local error registers, wherein the error handling device is further to:
determine whether the received error message indicates a local error message, wherein the determined group of error registers are in the local error registers in response to the received error message indicating the local error message, and wherein the determined group of error registers are in the global error registers in response to the received error message not indicating a local error message; and
forward error messages logged in the global error registers to the global error handling device.

8. The error handling device of claim 7, wherein the local error registers provide groups of registers preassigned to internal errors from the error handling device and errors from at least one local fabric coupled to the error handling device, wherein the error handling device is further to:
log a received error message of the received error messages in the group of registers in the local error registers and in a group of registers in the global error registers; and
forward the received error message logged in the group of registers in the local error registers and the global error registers to the global error handling device.

9. The error handling device of claim 8, wherein received error messages for the internal errors and the errors from the at least one local fabric are logged in one group of registers in the global error registers.

10. The error handling device of claim 7, wherein the global error registers log errors from legacy and Peripheral Component Interconnect Exchange (PCIe) devices coupled to the error handling device, wherein the local error registers log internal errors from the error handling device and errors from at least one local fabric coupled to the error handling device, and wherein one group of error registers in the global error registers associated with one value of the values logs the internal errors and the errors from the at least one local fabric.

11. The error handling device of claim 1, wherein the computer system includes a plurality of additional error handling devices in the computer system that log errors for different devices in the computer system than errors handled by the error handling device and a global error handling device to log received error messages from the error handling device and the additional error handling devices, wherein the additional error handling devices and the error handling device are programmed with a unique identifier to distinguish the error handling devices, wherein the error handling device is further to:
forward received error messages logged in the groups of error registers to the global error handling device including the unique identifier of the error handling device.

12. The error handling device of claim 1, wherein the error handling device is further to:
forward received error messages logged in the groups of error registers to a global error handling device over a primary interface to an additional error handling device when the error handling device does not provide a direct interface to the global error handling device, wherein the additional error handling device that receives the received error message forwards the received error message to the global error handling device; and
forward received error messages logged in the groups of error registers to the global error handling device when the error handling devices provides a direct interface to the global error handling device.

13. The error handling device of claim 12, wherein the error handling device is further to:
receive an error message on a primary interface directed to the global error handling device;
log the received error message directed to the global error handling device in the error registers; and
forward the error message to the global error handling device over a direct interface.

14. A system, including:
a processor;
a plurality of devices in communication with the processor;
an error handling device to log errors in the system, wherein the error handling device is configured to:
provide groups of error registers, wherein each group of error registers is associated with a value of a plurality of values, and wherein each of the devices that communicate errors to the error handling device and is associated with one of the values;
provide a decoder to map the devices to the values;

receive error messages from the devices connected to the error handling device; and for each received error message of the received error messages:
  determine, from the decoder, a value of the plurality of values associated with a device transmitting the received error message;
  determine a group of error registers, of the groups of error registers, that is associated with the determined value; and
  log the received error message in the determined group of error registers.

15. The system of claim 14, wherein the decoder maps port identifiers of the devices to the values, wherein to determine the value associated with the device communicating the received error message comprises:
  determine, from the decoder, the value mapping to a port identifier of the device transmitting the received error message.

16. The system of claim 14, including:
  a global error handling device;
  a system event control register indicating, for each severity level of a plurality of severity levels, whether the received error messages having a severity level are masked or unmasked;
  wherein the error handling device is further to:
    indicate, in the group of error registers, a severity level of an error indicated in the received error message; and
    forward the received error message to the global error handling device in response to the system event control register indicating that the severity level indicated in the group of error registers for the received error message is unmasked.

17. The system of claim 14, wherein each group of error registers includes error severity status registers for error severity levels and a mask register for each of the error severity levels and error severity status registers, wherein to log the received error message in the determined group of registers comprises:
  determine whether the mask register for an error severity level indicated in the received error message indicates that the error severity level is masked or unmasked, wherein the received error message is logged in response to the mask register for the error severity level indicating that the error severity level is unmasked, and wherein to log the received error message further comprises indicating the error severity level in the received error message in the error severity status register for the error severity level in the received error message, wherein the received error message is not logged in the group of error registers in response to the mask register for the error severity level of the received error message indicating masked.

18. The system of claim 14, further comprising:
  a global error handling device, wherein the groups of error registers include global error registers and local error registers, wherein the error handling device is further to:
    determine whether the received error message indicates a local error message, wherein the determined group of error registers are in the local error registers in response to the received error message indicating the local error message, and wherein the determined group of error registers are in the global error registers in response to the received error message not indicating a local error message; and
    forward error messages logged in the global error registers to the global error handling device.

19. The system of claim 14, further comprising:
  a plurality of additional error handling devices;
  a global error handling device;
  wherein the error handling device is further to:
    forward received error messages logged in the groups of error registers to the global error handling device over a primary interface to an additional error handling device when the error handling device does not provide a direct interface to the global error handling device, wherein the additional error handling device that receives the received error message forwards the received error message to the global error handling device; and
    forward received error messages logged in the groups of error registers to the global error handling device when the error handling device provides a direct interface to the global error handling device.

20. A method for an error handling device to log errors in a computing system including a plurality of devices connected to the error handling device, comprising:
  providing groups of error registers, wherein each group of error registers is associated with a value of a plurality of values, and wherein each of the devices communicate errors to the error handling device and are associated with one of the values;
  providing a decoder to map the devices to the values;
  receiving error messages from the devices connected to the error handling device; and
  for each received error message of the received error messages:
    determining, from the decoder, a value of the plurality of values associated with the device communicating the received error message;
    determining a group of error registers, of the groups of error registers, that is associated with the determined value; and
    logging the received error message in the determined group of error registers.

21. The method of claim 20, wherein the decoder maps port identifiers of the devices to the values, wherein the determining the value associated with the device communicating the received error message comprises:
  determining, from the decoder, a value mapping to a port identifier of the device communicating the received error message.

22. The method of claim 20, further comprising:
  providing a system event control register indicating, for each severity level of a plurality of severity levels, whether the received error messages having a severity level are masked or unmasked;
  indicating in the group of error registers a severity of an error indicated in the received error message; and
  forwarding the received error message to a global error handling device in response to the system event control register indicating that the severity level indicated in the group of error registers for the received error message is unmasked.

23. The method of claim 20, wherein each group of error registers includes error severity status registers for error severity levels and a mask register for each of the error severity status registers, wherein the logging the received error message in the determined group of registers comprises:
  determining whether a mask register for a severity level indicated in the received error message indicates that the severity level is masked or unmasked, wherein the received error message is logged in response to the mask register for the severity level indicating that the severity level is unmasked, and wherein to log the received error message further comprises indicating the severity level in the received error message in the error severity status register for the severity level in the received error message, wherein the received error message is not logged in the group of error registers in response to the mask register for the severity level of the received error message indicating masked.

24. The method of claim 20, wherein the groups of error registers include global error registers and local error registers, further comprising:
determining whether the received error message indicates a local error message, wherein the determined group of error registers are in the local error registers in response to the received error message indicating the local error message, and wherein the determined group of error registers are in the global error registers in response to the received error message not indicating a local error message; and
forwarding error messages logged in the global error registers to a global error handling device.

25. The method of claim 20, further comprising:
forwarding received error messages logged in the groups of error registers to a global error handling device over a primary interface to an additional error handling device when the error handling device does not provide a direct interface to the global error handling device, wherein the additional error handling device receives the received error message and forwards the received error message to the global error handling device; and
forwarding received error messages logged in the groups of error registers to the global error handling device when the error handling devices provides a direct interface to the global error handling device.

* * * * *